United States Patent
Kumeth

(10) Patent No.: US 7,237,328 B2
(45) Date of Patent: Jul. 3, 2007

(54) PRODUCTION AND/OR INSTALLATION DEVICE

(75) Inventor: Sigmund Kumeth, Kastl (DE)

(73) Assignee: Feintool International Holding, Lyss (CH)

(*) Notice: Subject to any disclaimer, the term of this patent is extended or adjusted under 35 U.S.C. 154(b) by 139 days.

(21) Appl. No.: 10/942,642

(22) Filed: Sep. 16, 2004

(65) Prior Publication Data

US 2005/0060879 A1 Mar. 24, 2005

(30) Foreign Application Priority Data

Sep. 19, 2003 (DE) .............................. 103 43 978

(51) Int. Cl.
*B23P 21/00* (2006.01)

(52) U.S. Cl. ............................ 29/783; 29/791; 29/559; 29/281.1; 269/58; 269/71; 269/309

(58) Field of Classification Search .................. 29/563, 29/38 A, 464, 559, 783, 791, 281.1, 281.4; 409/158, 159; 82/129; 269/58, 59, 61, 71, 269/289 R, 309
See application file for complete search history.

(56) References Cited

U.S. PATENT DOCUMENTS 2,324,523 A * 7/1943 Lund ............................ 29/730
4,313,260 A * 2/1982 Yeo et al. ..................... 29/792
5,092,021 A 3/1992 Buzzi
5,603,245 A 2/1997 Walczak et al.
6,553,656 B1 * 4/2003 Kumeth ....................... 29/785

FOREIGN PATENT DOCUMENTS

| DE | 42 12 887 | 5/1993 |
| DE | 197 28 264 | 1/1999 |
| DE | 197 49 633 | 5/1999 |
| EP | 0 438 975 | 7/1991 |
| EP | 690 02 750 | 7/1991 |
| WO | WO 9858763 A1 * | 12/1998 |

* cited by examiner

*Primary Examiner*—Jermie E. Cozart
(74) *Attorney, Agent, or Firm*—Jordan and Hamburg LLP

(57) ABSTRACT

Production and/or installation device for producing and/or installing a workpiece, with a device frame and a workpiece support table, which has several workpiece supports and is rotating with respect to one or more stationary work stations and can be moved in synchronized fashion, and with a driving mechanism for driving the one or more workstations, which driving mechanism has a motor and at least one essentially vertically movable coupling element, the movement of which is coupled indirectly with the motor and with which a driver of a work station is or can be coupled, the driving mechanism having a working shaft, which is disposed vertically and can be rotated by the motor, with a guiding device, with which the movement of the coupling element is coupled and over which the vertical movement of the coupling element is controlled.

14 Claims, 7 Drawing Sheets

US 7,237,328 B2

PRODUCTION AND/OR INSTALLATION DEVICE

BACKGROUND OF THE INVENTION

The invention relates to a production and/or installation device for producing and/or installing a workpiece, with a device frame and a workpiece support, which has several workpiece supports and is rotating with respect to one or more stationary work stations and can be moved in synchronized fashion, as well as with a driving mechanism for driving the one or several workstations, which driving mechanism has a motor and at least one essentially vertically movable coupling element, the movement of which is coupled indirectly with the motor and with which a driver of a work station is or can be coupled.

Such a production and/or installation device is known, for example, from the DE 197 49 633 A1. It is a question here of a revolving automatic machine with a workpiece support table, which is also referred to as a turntable, at which the workpiece supports are moved in synchronized fashion about a central device axis with respect to workstations disposed above therefrom and can fulfill the different tasks. Such a device is used wherever an object is to be produced mechanically in several manufacturing or installation steps, for example, in the case of the production of electrotechnical or electromechanical components, precision mechanical workpieces or also in the pharmaceutical sector and in the automobile industry. With such a device, it is possible to assemble or produce the workpiece continuously, piece by piece, for which purpose it is brought in synchronized fashion to the respective workstations, which can take hold of and integrate the individual parts of the workpiece, which are brought along over feeding facilities, which are also provided on the device, or carry out other activities with respect to the workpiece. Handling devices in the form of tongs and grippers can, for example, be used as workstations; likewise, screwing, welding or soldering devices as well as embossing and printing devices can be used. A feeding facility may, for example, be a component-conveying device. Likewise, it may also be a stacking device or a stamping strip with a corresponding stamping device, in order to stamp out the component required, which is subsequently to be processed at the work station, from a component strip.

SUMMARY OF THE INVENTION

The workstation is driven by a driving mechanism, which is especially provided for this purpose and ensures that the workstations carry out the necessary function at the proper time. As a rule, such a driving mechanism is mechanically controlled. The central driving element is a motor, the movement of which is coupled indirectly with one or two coupling elements, which are provided in the upper region, that is, in the region of the workstations. In turn, a driver, usually in the form of a working lever of a workstation, is coupled with these coupling elements. With the help of the motor and the driving mechanism, it is now possible to move the coupling element or elements vertically. This leads to a corresponding driver movement or working lever movement of the workstation, which then carries out the correspondingly assigned vertical or horizontal movement.

A driving mechanism, such as that known, for example, from DE 197 28 264 A1, comprises the motor, which drives two cam disks, which rotate about a horizontal axis, over a downstream bevel gear. In turn, these are connected with two vertically disposed lifting rods, which pass through the device vertically, and at the upper end of which the ring-shaped or disk-shaped coupling elements are disposed, with which the drivers of the workstations are coupled. During a rotation of the cam disks, the lifting rods are moved vertically corresponding to the shape of the disks and, with them, the coupling elements, over which the movement of the workstations finally is controlled.

For the device known from the DE 197 28 264, the central elements of the driving mechanism, namely the motor, the bevel gear and the cam disks, are positioned in the frame of the device beneath the construction plate, on which the feeding devices are disposed. This means that the whole of the lower region of the device frame is occupied by the driving mechanism. Aside from the fact that such a driving mechanism is very complex and expensive, there is furthermore the need to provide a separate control cabinet, in which the controls for the device are accommodated, since there is no space for these in the device.

It is therefore an object of the invention to indicate a device, which is improved in this regard.

To accomplish this objective for a production and/or installation device of the type named above, provisions are made pursuant to the invention so that the driving mechanism has a drive shaft, which is disposed vertically and can be rotated by the motor, with a guiding device, with which the movement of the coupling element is coupled and over which the vertical movement of the coupling element is controlled.

The inventive device proposes a completely different driving concept, for which only the motor and a transmission, downstream from the motor, are positioned beneath the construction plate, that is, in the lower region of the device frame. The components for the vertical guidance of the coupling element or elements have namely been shifted to the top and are no longer in the lower region of the device frame, where they are located in the state-of-the-art. The driving impetus is provided by a rotating, central, vertical drive shaft, at which a guiding device is provided, which, when the shaft rotates, rotates similarly and the movement of which is coupled with that of a coupling element. The guiding device is designed in such a manner, that the desired vertical movement of the coupling element is controlled appropriately.

In comparison to previously known cam disk mechanisms and lifting rod mechanisms, the driving mechanism, conceived for the inventive device, is significantly simpler. This furthermore leads to a distinct reduction in manufacturing costs. It is furthermore a remarkable advantage that, aside from the motor and the transmission of relatively small format, no other driving components have to be provided in the lower region of the device, that is, below the construction plate. This space can be utilized particularly advantageously for integrating the control device, so that the separate control cabinet, which is always required in the state of the art, can also be omitted. Overall, a significant simplification of the device is realized on the basis of the inventive driving mechanism. At the same time, however, devices, designed with the same number of workstations in the modular construction known from DE 197 49 633 A1, can be conceived in a standardized basic frame with the inventive device.

As already described, the possibility exists of disposing a guiding device, which ensures a horizontal or vertical movement of the work station or of its working implements, depending on the design, at the vertical drive shaft. Of course, the possibility also exists of providing two separate guiding devices, which are disposed one above the other and with which in each case the motion of one coupling element, with which in each case one driver of a workstation is or can be coupled, is coupled. In this case, one coupling element would be provided for the vertical motion and the other one for the horizontal motion of the workstation.

According to a first development of the invention, a guiding device can be constructed as a peripheral guiding projection, which protrudes to the outside and on which run one or more running or sliding elements, which are provided at the coupling element and advantageously may be constructed as rollers or cylinders. The guiding projection runs around the drive shaft and describes a curved or undulating shape, which the coupling element, because it is coupled, follows over the rollers or cylinders, and is moved vertically corresponding to the curved shape. Advantageously, two running or sliding elements, especially two rollers or cylinders, are disposed opposite to one another, the guiding projection being accommodated between the pair. For adjustment, it is advisable if the or at least a portion of the running or sliding elements, especially the rollers or cylinders, is vertically adjustable.

As an alternative to the design of the guiding device with an outwardly protruding guiding projection, the possibility exists of constructing the guiding device as a peripheral groove, which is engaged by one or more running or sliding elements, which are provided at the coupling element and are constructed, in this case, advisably as pins, which protrudes essentially horizontally. In this case also, the guiding groove, which runs around the drive axis, describes a corresponding curvilinear or undulating shape, which controls the vertical motion and which is followed correspondingly by the coupling element.

In an appropriate development of the invention, the guiding projection or the guiding groove is formed at a ring disposed at the drive shaft. This ring, which may be manufactured separately, is fastened in a suitable manner at the drive shaft. If two guiding devices are provided, two appropriate rings, of course, must be disposed at the shaft.

As described, the vertical motion of the coupling element is controlled owing to the fact that the running or sliding elements are guided by the guiding projection or the guiding groove. In order to realize a motion, which is, as far as possible, free of friction, the possibility exists of coating the running or sliding element or elements with a material having a low frictional resistance or of producing the element or elements from such a material. Of course, the elements may also originally consist of metal, as long as the friction is low.

Pursuant to the invention, the motor itself drives the driving gear wheel preferably over an interposed transmission, which interacts directly or indirectly with a gear wheel or ring gear, provided at the drive shaft, and drives the shaft.

For the inventive equipment, the function of the motor is not only to drive the drive shaft and, with that, the coupling elements. Rather, it has also the function of driving the turntable, at which the workpiece supports are disposed. For this purpose, a driver disk can be rotated, pursuant to the invention, by the motor. This driver disk has a driver, interacts with an index disk, which, in turn, is connected with the turntable and is assigned to the workpiece support for the synchronized motion of the latter. In order to provide a common driving mechanism for the driver disk as well as for the drive shaft, it is appropriate if the driving gear wheel, driven by the motor, interacts over an intermediate gear wheel with the gear wheel or ring gear on the shaft and if a further gear wheel, which can be driven with the intermediate gear wheel about the same axis, is provided and interacts with a gear wheel provided at the driver disk. Advisably, the further gear wheel and the gear wheel on the driver disk are constructed as elliptical gear wheels. In order to enable the work cycle to be changed, it is furthermore possible to exchange the motor-driven driving gear wheel and the intermediate gear wheel for one another, both of which can be detached. Consequently, because of the different gear ratios and gear wheel designs, there is a change in the drive and in the work cycle, which can be utilized.

It is particularly advantageous if the drive shaft is a hollow shaft. This makes it possible to pass the supply lines and control leads from control equipment, disposed in the device frame below the already described construction table, to the drive stations or to other consumers in the upper region of the device.

Further advantages, distinguishing features and details of the invention arise out of the example, which is described in the following, as well as from the accompanying drawings.

DESCRIPTION OF THE PREFERRED EMBODIMENTS

Figure 1:
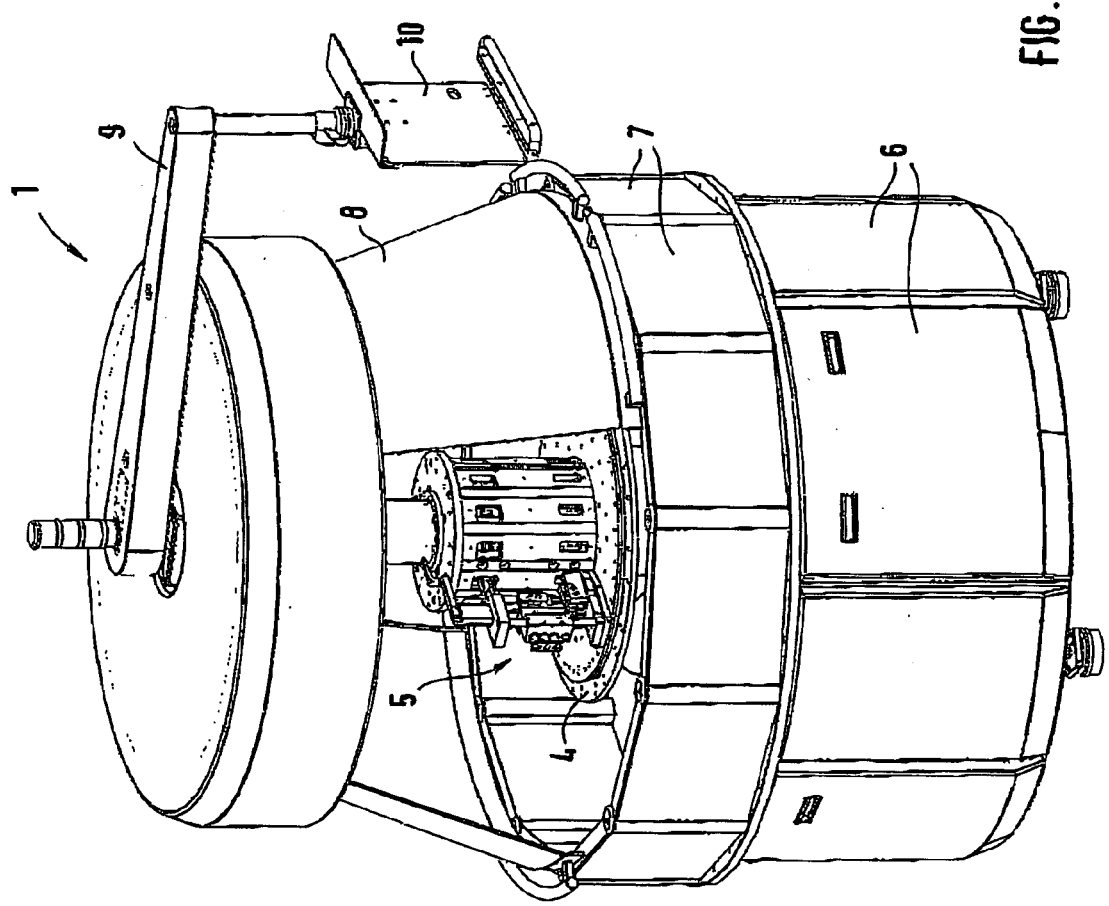
FIG. 1 shows a perspective view of an inventive production and/or installation device.
Figure 2:
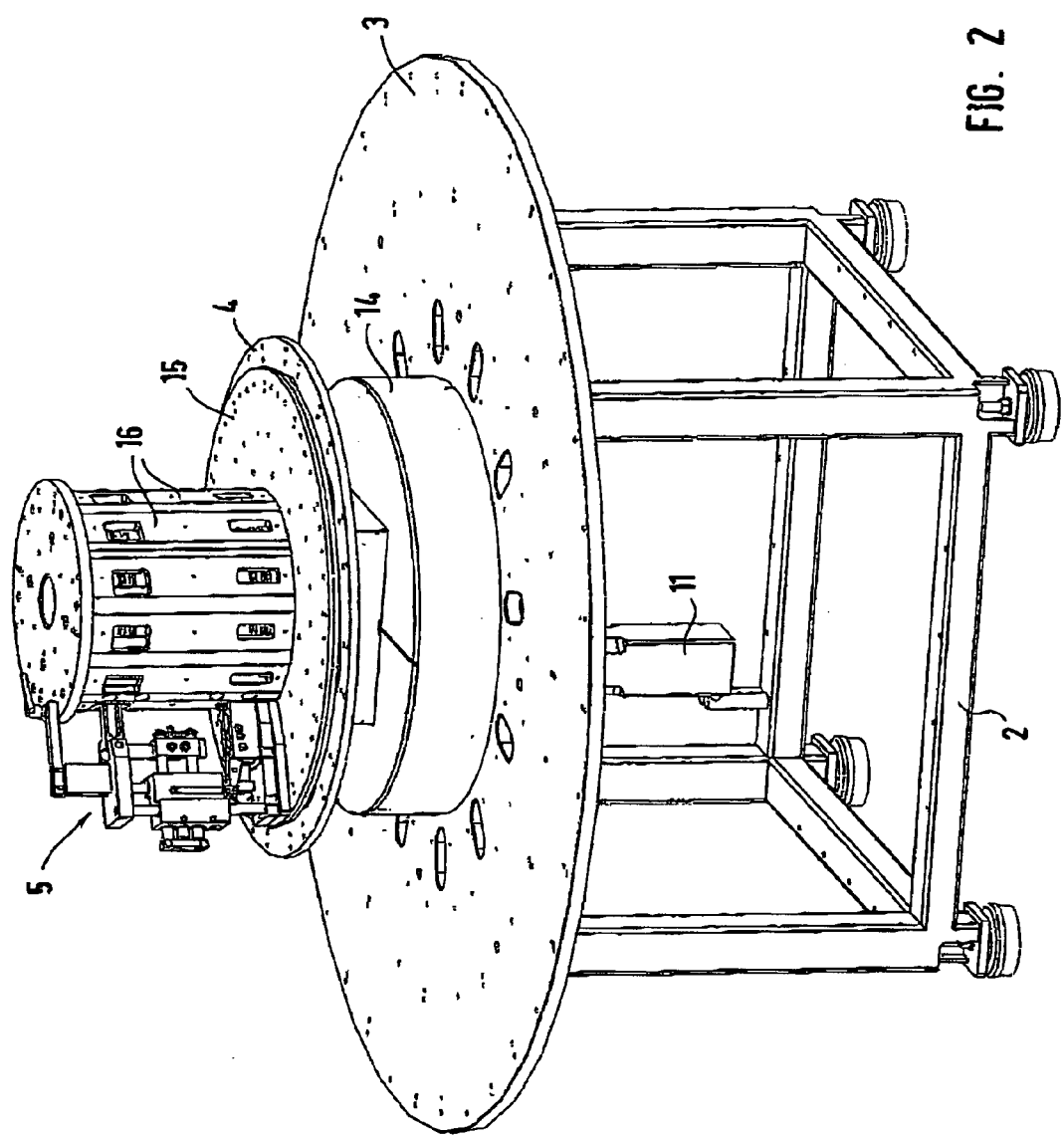
FIG. 2 shows a perspective view of the device frame with the working configuration.

FIG. 1 shows an inventive production and/or installation device 1. This comprises, as shown in FIG. 2, a device frame 2, on the upper side of which a construction plate 3 is disposed, on which appropriate feeding equipment, the details of which are not shown, may be disposed. The local positioning, as well as the number of feeding attachments, which may be disposed, depends on the layout of the fastening holes in the construction plate 3. Furthermore, a workpiece support table 4 in the form of a turntable, at which workpiece supports, the details of which are also not shown, may be fastened in suitable seats, is also provided. This turntable 4, as will be described in the following, may be moved in synchronized fashion with the stationary workstations 5, of which one is shown in FIGS. 1 and 2. These workstations remove a small part, which has been brought along by a feeding device, and integrate the same in the workpiece at the workpiece support, which is in the working area of the workstation 5.

Figure 3:
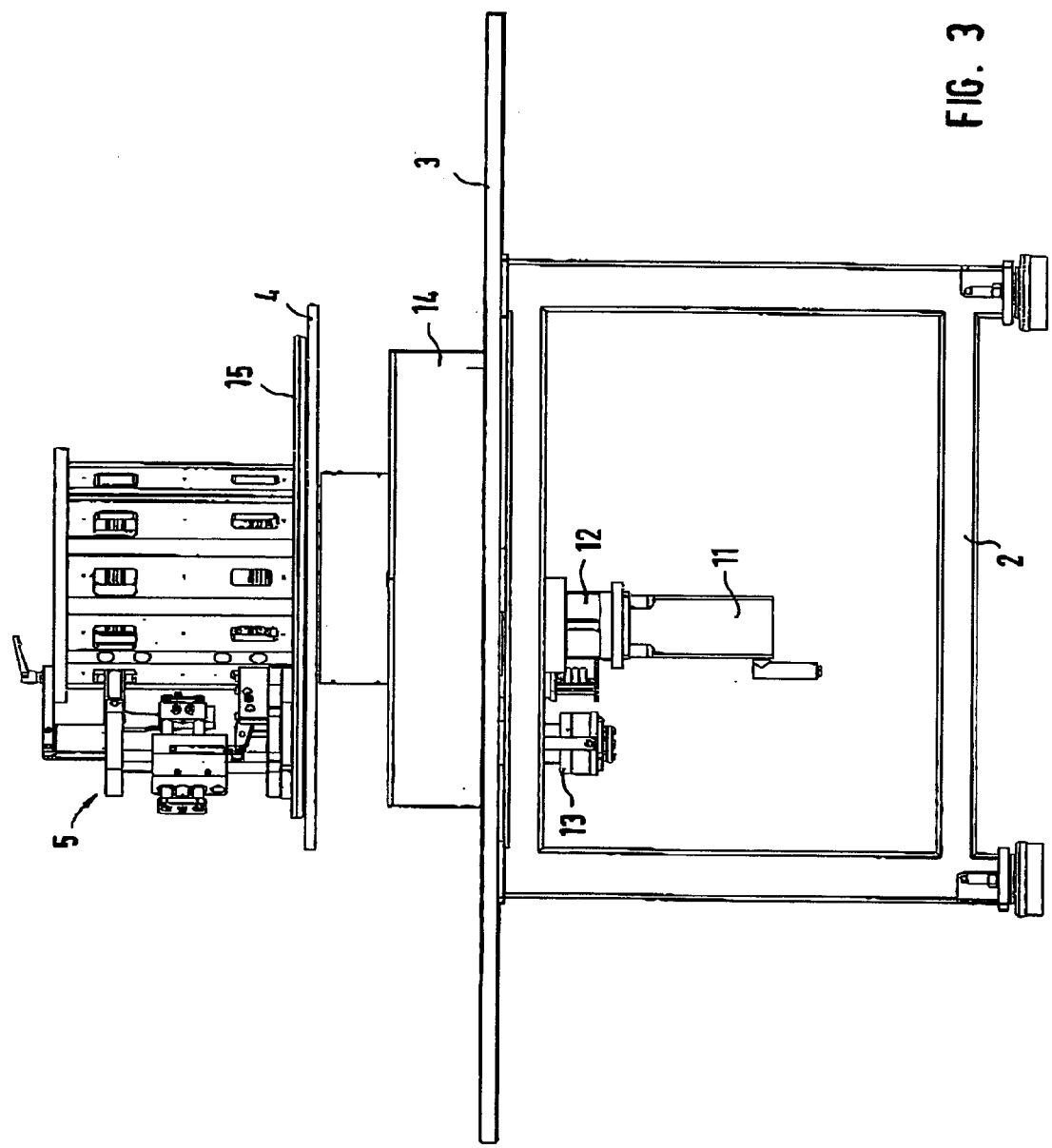
FIG. 3 shows a side view of the representation of FIG. 2.

In the lower region, the device frame is closed off by appropriate panels or disks 6, some of which can be detached in order to gain access to the interior of the device. The adjoining region, in which the feeding equipment may be fastened, is, as long as none are provided, also closed off by suitable panels or disks 7. Furthermore, the upper region, in which any movable parts of the feeding equipment and especially of the workstations move, is closed off completely by curved disks 8 in the example shown. In order to gain access to the interior, it is possible to move a disk 8 somewhat towards the outside and to guide it over an adjacent disk. Furthermore, the horizontal support 9 is shown, at which a seat 10 for a control device is provided, the details of which are not shown, FIGS. 2 and 3 show the device of FIG. 1 without the housing parts. A motor 11 is shown, which is disposed in the interior of the device frame 2 below the construction plate 3 and has the central function of driving the work stations 5 as well as the turntable 4. In the region below the construction plate 3, downstream from the motor, there is the transmission 12 as well as an overload clutch 13, which will be discussed in the following. Above the construction plate 3, there is the transmission housing 14, in which the motor 11 or the transmission 12 and the downstream drive components are coupled for bringing about movement. The turntable 4 as well as the stationary construction plate 15, on which the workstations 5 can be positioned in accordance with the hole layout there, are downstream from the transmission housing 14. These work stations 5 engage drivers in the form of lever arms, which will be described below, at appropriate coupling elements in the form of disk-like or ring-like lifting plates, which are disposed behind suitable panels 16.

As shown, in particular, in FIG. 3, only the motor 11, the transmission 12 and the overload clutch 13 are in the region of the device frame 2 in the case of the inventive device. Otherwise, the whole region is available for integrating the control system for the device.

Figure 4:
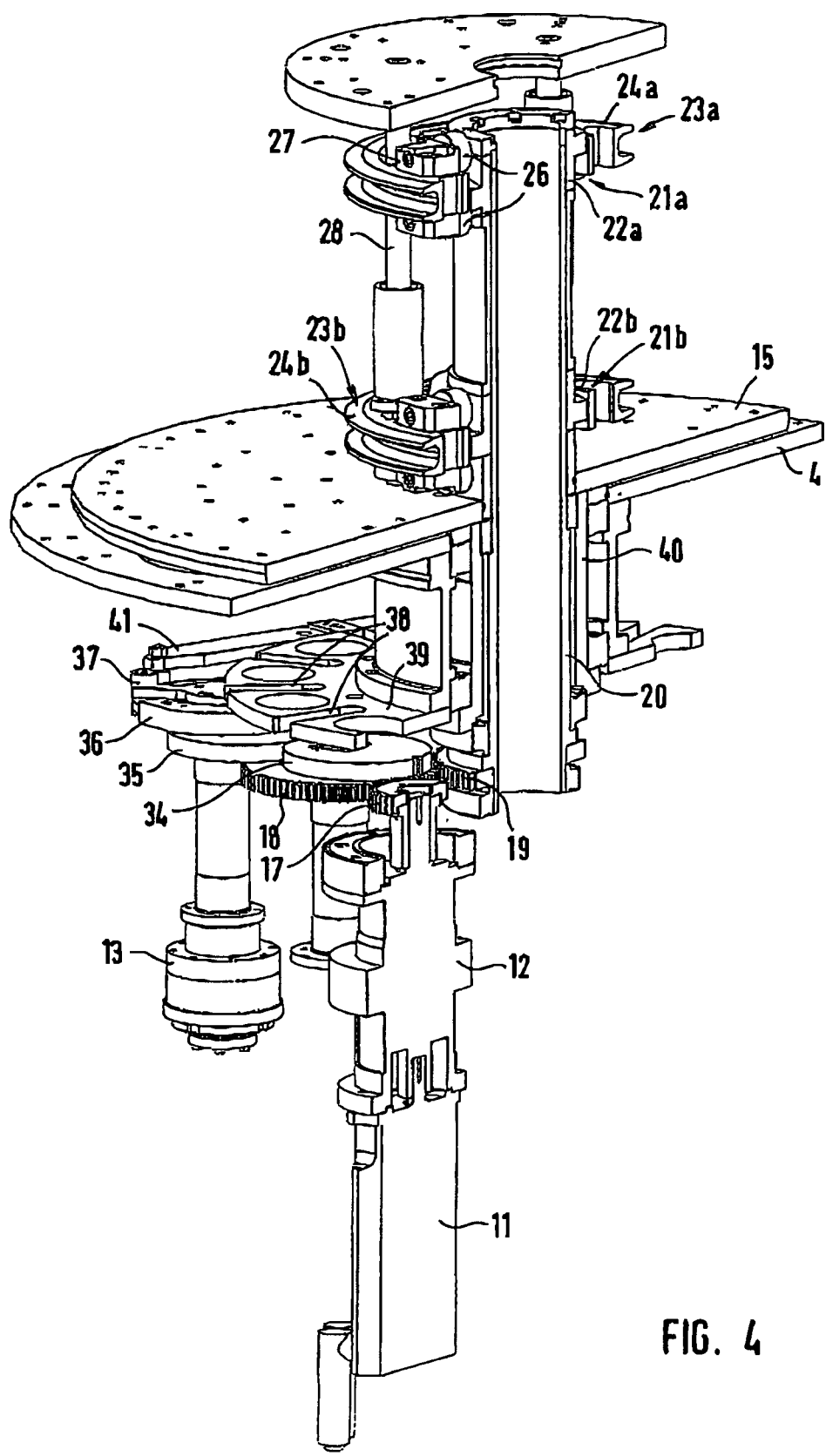
FIG. 4 shows a detailed representation of the drive mechanism for the coupling elements as well as the turntable.
Figure 7:
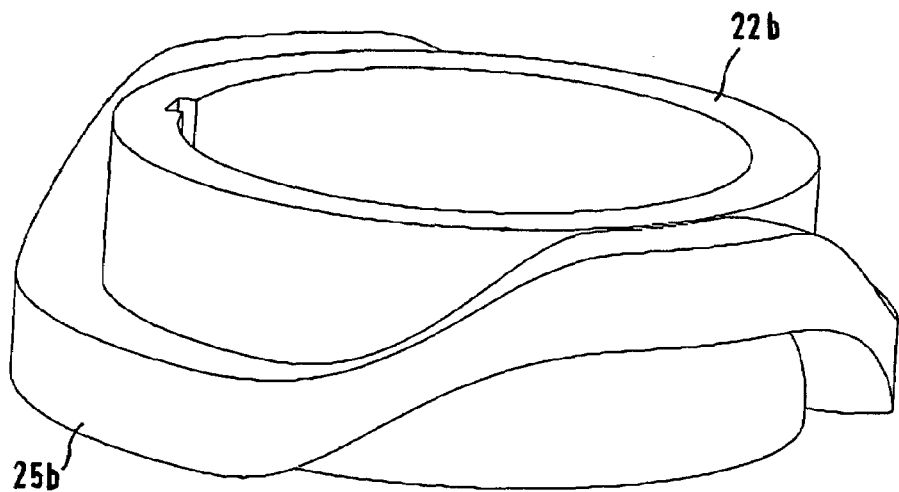
FIG. 7 shows a guide ring with a guiding projection for the vertical lift.
Figure 8:
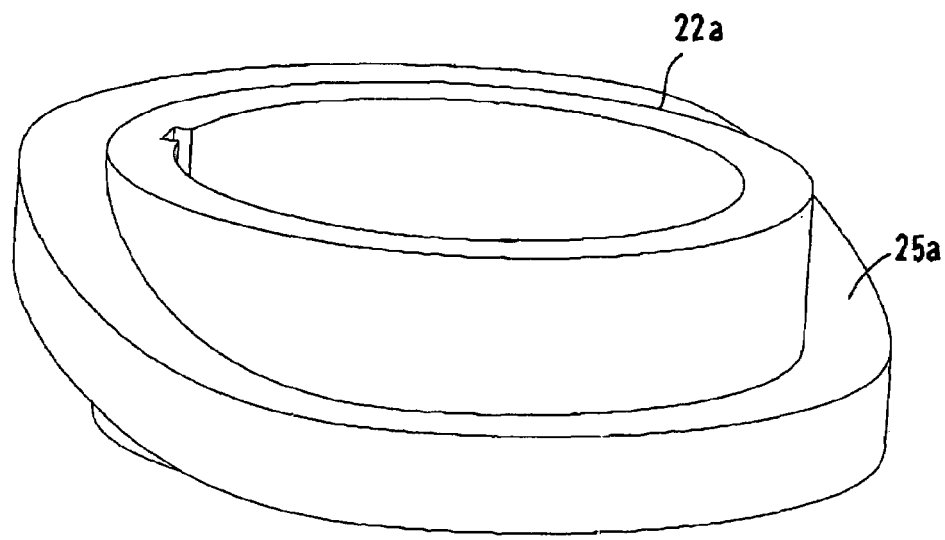
FIG. 8 shows a guide ring with a guiding projection for the horizontal lift.

FIG. 4 shows the inventive driving mechanism for the workstations 5 as well as for the turntable 4. The motor 11 and the transmission 12, downstream from the motor 11, are shown. A driving gear wheel 17, which meshes with an intermediate gear wheel 18, is driven by the transmission 12. This intermediate gear wheel 18, in turn, meshes with a gear wheel or ring gear 19, which is disposed at a hollow drive shaft 20. This hollow drive shaft extends from the transmission housing 14, where the gear wheel connection described is disposed, through a central opening in the turntable 4 and the construction plate 15 into the upper region of the device, where it is mounted appropriately. At the drive shaft 15, in the region above the construction plate 15, two guiding devices 21a and 21b are provided in the form of guide rings 22a, 22b, which are firmly connected with the drive shaft 20. These guide rings 22a, 22b, which will be dealt with in the following, have the task of ensuring that the coupling elements 23a, 23b, which are coupled with them and both of which are constructed as ring-shaped or disk-shaped lifting plates 24a, 24b, are guided vertically. For this purpose, guiding projections 25a and 25b are provided at the guide rings 22a, 22b (FIGS. 7 and 8). The guiding projections 25a and 25b protrude radially outward at the guide rings 22a, 22b and are curve-shaped or undulating. Running or sliding elements 26 in the form of two rollers or cylinders run on the upper side and underside of these guiding projections 25a, 25b, as shown in FIG. 4. These running or sliding elements are disposed in suitable mounts 27 at the inner periphery of a lifting plate 24a, 24b. At least one of the rollers or cylinders is disposed so that it can be moved vertically, in order to bring the whole of the mimicry into precise contact with the respective guiding projection.

Figure 5:
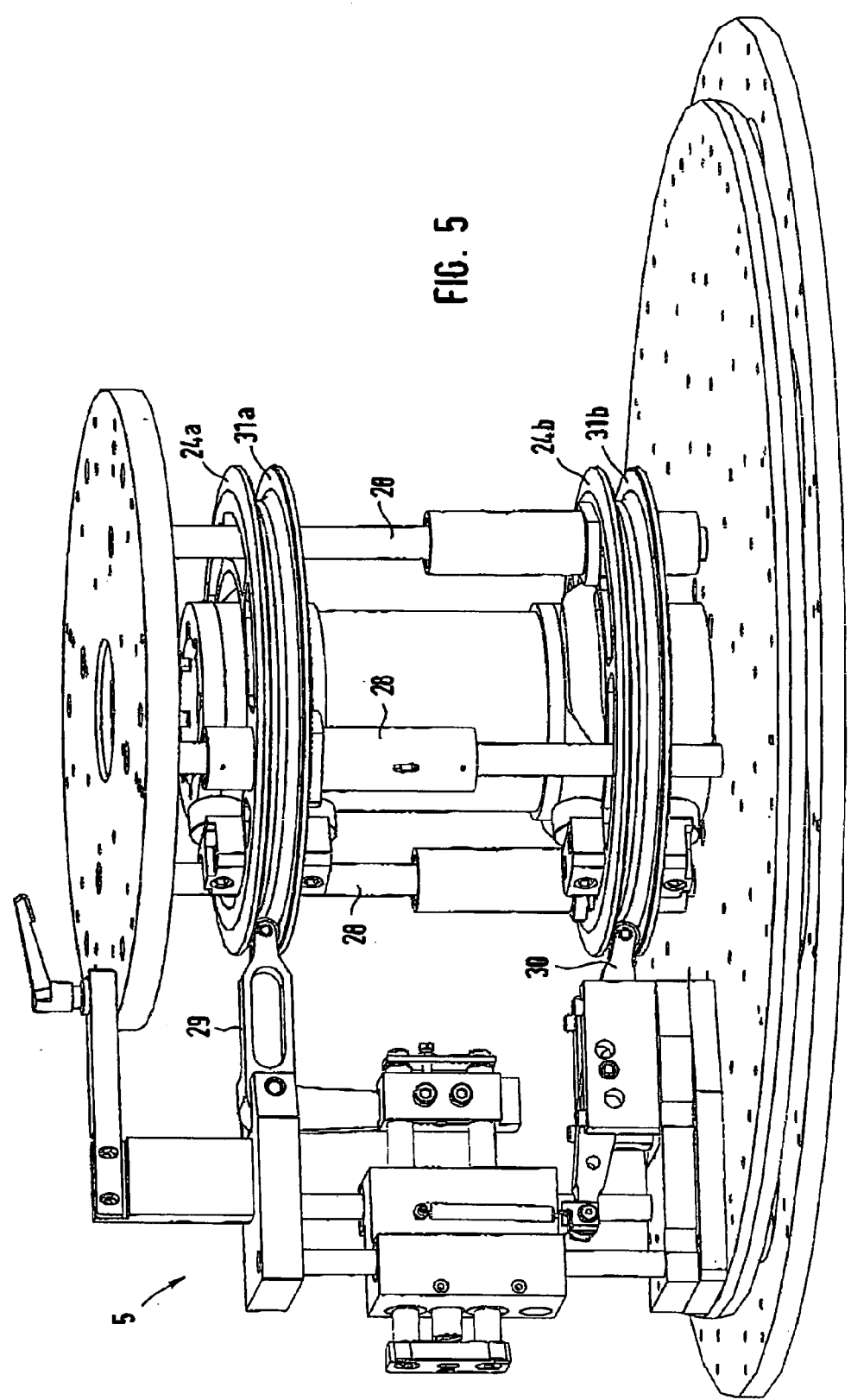
FIG. 5 shows a detailed representation of the device in the region of the drive stations.
Figure 6:
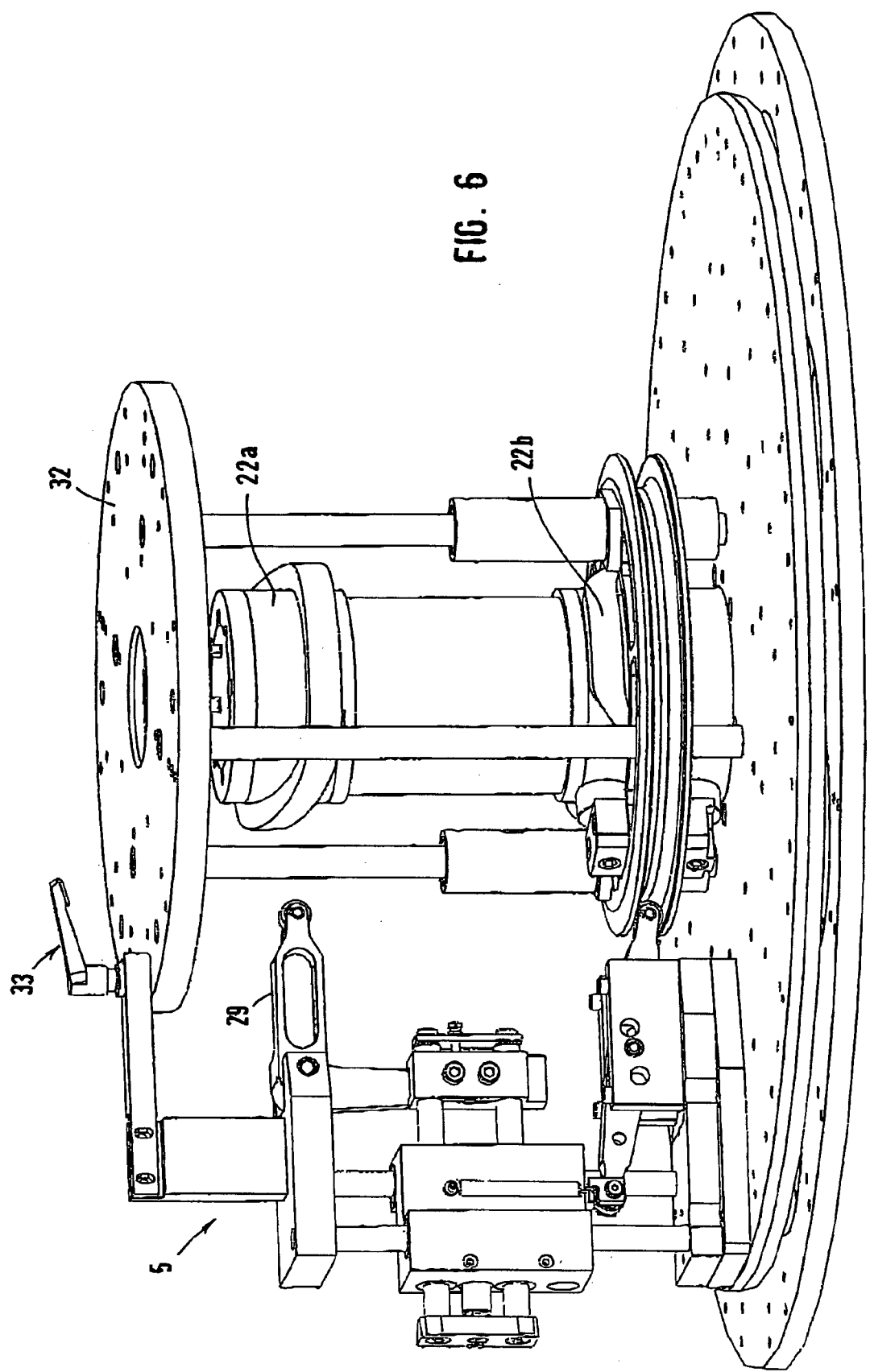
FIG. 6 shows the view of FIG. 5 with only one coupling element.

If now the motor 11 is driven, the drive shaft 20 is driven indirectly. During a rotation of the drive shaft 20, the two guide rings 22a, 22b are also rotated and, with them, the respective guiding projections 25a, 25b. Because of the curved shape of the latter, the two lifting plates 24a, 24b, which are disposed at suitable vertical guides 28, which follow the curved shape because of the roller or cylinder contact, are moved vertically. This vertical movement is transferred to drivers 29, 30 of a workstation 5, the drivers 29 and 30 being constructed as working levers. With their inward ends, these engage a coupling groove 31a or 31b of the respective lifting plates 24a, 24b. During a vertical movement of the respective lifting plate 24a, 24b, the corresponding drivers 29, 30 are also moved vertically. This vertical movement is converted into a corresponding horizontal movement of a working element of the workstation 5 (over the driver 29) or into a vertical movement of a work element of the workstation 5 (over the drive 30). The coupling of the movement of the lifting plates with that of the respective drivers is shown in FIGS. 5 and 6. FIG. 5 shows the two lifting plates, whereas the upper lifting plate is omitted in FIG. 6. Furthermore, the two Figures show that, at the upper side, an end plate 32 is provided, at which the workstation is held additionally over a suitable fastening device 33.

As already described, FIGS. 7 and 8 show the two guide rings 22a, 22b. As described, the guide ring 22a or guiding projection 25a is responsible for the horizontal travel. During one rotation of the guide ring 22a, the lifting plate 24a runs back and forth between a lowest and a highest position. A single horizontal movement of a working element of the workstation 5 towards the outside and towards the inside is controlled by these means during one revolution of the shaft.

On the other hand, the guiding projection 25b of the guide ring 22b, which is responsible for the vertical lift, shows two complete curves. This means that the lifting plate 24b runs back and forth twice between a lowest and a highest position during one revolution of the shaft. As a result, the working element, controlled by the driver 30, carries out two vertical movements during one revolution of the shaft. Of course, it is also conceivable to provide other curve shapes, depending on the design of the device and of the workstation.

As can be inferred from FIG. 4, not only the drive shaft 20 and the lifting plate 24a, 24b and, with that, the workstations 5 are driven by the motor 11, but also the turntable 4. For this purpose, a further gear wheel 34, in the form of an elliptical gear wheel, which rotates about the same axis as the intermediate gear wheel 18, is provided on the intermediate gear wheel 18 and meshes with a gear wheel 35, which is also constructed as an elliptical gear wheel, with which, in turn, a drive disk 36 is connected with an upwardly protruding driver 37. The driver disk 36, as well as the gear wheel 35, are connected with the overload clutch 13. While the motor 11 is running, the intermediate gear wheel 18 and, with the latter, the further gear wheel 34 are rotating and, over the latter, the gear wheel 35 and, with that, the driver disk 36 are moved. During such a rotation, the driver 37 engages an appropriately positioned recess 38 at an index disk 39, which is also disposed in the transmission housing 14 and is coupled, in turn, with the turntable 4 over a tubular connection 40, through which the drive shaft 20 passes. The index disk 39 is now rotated through an angular increment by means of the driver 37 about the central axis of rotation and, with it, the turntable 4 is moved further by an angular increment corresponding to the cycle. This means that the respective workpiece supports are conveyed from one workstation to the next. When the corresponding index disk position is reached and the driver 37 leaves the respective index disk groove 38, locking means 41 engage the index disk 39 and lock it in its position until the next shift.

The inventive device comprises a novel, standardizable, basic frame, which is shown in the Figures and the driving mechanism of which is significantly simpler and which, moreover, offers adequate space for accommodating all the control equipment. Overall, a closed device can be created in this way, which requires no additional, external implements, such as a control cabinet. In keeping with the modular concept of the device, appropriately designed feeding devices as well as work stations and workpiece supports can be disposed detachably at the basic frame, depending on the workpiece, which is to be produced or the parts, which are to be brought up. This means that a simple retrofitting of the basic frame described is conceivable utilizing appropriate, differently conceived feeding devices, workpiece supports and workstations, in order to produce a new object. On the other hand, the basic construction of the basic frame does not have to be changed.

The invention claimed is:

1. Production and/or installation device for producing and/or installing a workpiece, comprising:
   a device frame and a workpiece support table which comprises a plurality of supports and is rotatable with respect to at least one stationary workstation,
   a driving mechanism for driving the at least one workstation,
   said driving mechanism comprising:
      a motor and at least one essentially vertically movable coupling element the movement of which is coupled indirectly with the motor and with which at least one driver of the at least one workstation is capable of being coupled,
      a working shaft which is disposed vertically and is rotatable by the motor, and
      at least one guiding device with which the movement of the coupling element is coupled and with which the vertical movement of the coupling element is controlled,
   wherein:
   the guiding device comprises a peripheral guiding projection that radially outwardly extends from said guiding device,
   two running or sliding elements on the coupling element and disposed opposite to one another, said two running or sliding elements running on said peripheral guiding projection, and
   at least one of the running or sliding elements being vertically movable.

2. The production and/or installation device of claim 1, wherein:
   said at least one guiding device includes two guiding devices disposed at the vertical working shaft,
   the two guiding devices being disposed one above the other,
   with the two guiding devices, the motion of one coupling element is coupled, and
   said at least one driver includes two drivers, each of said two drivers capable of being coupled with a respective one of said two guiding devices of the at least one workstation.

3. The production and/or installation device of claim 2, wherein a driver disk can be rotated by the motor and the driver disk has a driver which is a third driver, the third driver interacts with an index disk coupled to the workpiece support table for synchronized movement between the index disk and the workpiece support table.

4. The production and/or installation device of claim 1, wherein the running or sliding elements are rollers or cylinders.

5. The production and/or installation device of claim 1, wherein the running or sliding elements are constructed essentially as horizontally projecting pins.

6. The production and/or installation device of claim 1, further comprising a ring disposed on the drive shaft, said ring including the peripheral guiding projection or a guiding groove.

7. The production and/or installation device of claim 1, wherein the running or sliding elements comprising a coating of low frictional resistance or consist of such a material.

8. The production and/or installation device of claim 1, wherein the motor drives a driving gear wheel which is a first gear wheel, the driving gear wheel interacts directly or indirectly with a second gear wheel or ring gear provided on the vertical drive shaft.

9. The production and/or installation device of claim 8, wherein:
   the driving gear wheel interacts with an intermediate gear wheel which is a third gear wheel, and the driving gear wheel rotationally communicates with the second gear wheel or ring gear on the shaft, and
   a further gear wheel is provided which can be rotated with the intermediate gear wheel about a common axis and interacts with a driver disk gear wheel.

10. The production and/or installation device of claim 9, wherein the further gear wheel and the driver disk gear wheel are elliptical gear wheels.

11. The production and/or installation device of claim 9, wherein the driving gear wheel and the intermediate gear wheel are detachable and can be exchanged for one another.

12. The production and/or installation device of claim 1, wherein:
   the drive shaft is a hollow shaft and passing therethrough are supply lines for connecting supply equipment with the at least one workstation.

13. Production and/or installation device for producing and/or installing a workpiece, comprising:
   a device frame and a workpiece support table which comprises a plurality of supports and is rotatable with respect to at least one stationary workstation,
   a driving mechanism for driving the at least one workstation,
   said driving mechanism comprising:
      a motor and at least one vertically movable coupling element the movement of which is coupled indirectly with the motor and with which a driver of the at least one workstation is capable of being coupled,
      a working shaft disposed vertically and which is rotated by the motor, and
      a guiding device with which the movement of the coupling element is coupled and with which vertical movement of the coupling element is controlled,
   wherein:
   the motor drives a driving gear wheel which is a first gear wheel, and the driving gear wheel interacts with a second ear wheel or ring gear provided on the vertical drive shaft,
   the driving gear wheel interacts with an intermediate gear wheel and rotationally communicates with the second gear wheel or ring gear on the shaft, and
   a further gear wheel is provided which can be rotated with the intermediate gear wheel about a common axis and interacts with a driver disk gear wheel.

14. Production and/or installation device for producing and/or installing a workpiece, comprising:
- a device frame and a workpiece support table which has several supports and is rotatable with respect to at least one stationary workstation,
- a driving mechanism for driving the at least one workstation,
- said driving mechanism comprising:
  - a motor and at least one essentially vertically movable coupling element the movement of which is coupled indirectly with the motor and with which a driver of the at least one workstation is capable of being coupled,
  - a working shaft which is disposed vertically and can be rotated by the motor, and
  - a guiding device with which the movement of the coupling element is coupled and with which the vertical movement of the coupling element is controlled, wherein:
- the motor drives a driving gear wheel which is a first gear wheel, and the driving gear wheel interacts with a second gear wheel or ring gear provided on the vertical drive shaft,
- the driving gear wheel interacts with an intermediate gear wheel and rotationally communicates with the second gear wheel or ring gear on the shaft,
- a further gear wheel which is rotatable with the intermediate gear wheel about a common axis and interacts with a driver disk gear wheel, and
- the further gear wheel and the driver disk gear wheel are elliptical gear wheels.

* * * * *